Patented Aug. 25, 1953

2,650,214

UNITED STATES PATENT OFFICE 2,650,214

POLYMERS

Robert N. MacDonald, New Castle, Del., assignor to E. I. du Pont de Nemours and Company, Wilmington, Del., a corporation of Delaware No Drawing. Application July 29, 1950, Serial No. 176,777

2 Claims. (Cl. 260—77.5)

This invention relates to new condensation polymers and particularly to new alpha-amino acid polyamides.

Synthetic polyamides from alpha-monoamino-copolyamides (MacDonald U. S. Patents 2,572,844 Thus, high molecular weight alpha-amino acid copolymers (MacDonald U. S. Patents 2,572,844 and 2,534,283, of which the present application is a continuation-in-part) can be prepared by co-polymerizing the N-carboanhydrides of alpha-primary-aminocarboxylic acids containing at least one hydrogen on the alpha-carbon. However, these alpha-amino acid copolyamides, although useful in certain film and fiber outlets, are not as completely useful as is desired, particularly in those uses wherein "breathable" films are desired, i. e., films exhibiting water vapor permeability yet good water insensitivity. This combination of water vapor permeability and water insensitivity is highly desirable for such uses as raincoats, wrapping materials for foods, and the like but the combination of properties is in general not found in the hitherto known alpha-amino acid homopolyamides and copolyamides. In general these are either highly water insensitive and water vapor impermeable or are water vapor permeable but relatively water sensitive. Examples of the latter type of polyamides include those containing high proportions of combined DL-alanine and/or N-substituted, i. e., alpha-secondary amino acid units. Probably the most outstanding of these is DL-alanine homopolyamide. This polyamide is described in greater detail in the copending application of Miegel, Serial No. 197,513, filed November 24, 1950.

This invention has as an object the preparation of new alpha-monoaminomonocarboxylic acid polyamides. A further object is the provision of alpha - monoaminomonocarboxylic acid polyamides which in film or sheet form are water vapor permeable but at the same time water resistant. Another object is the provision of synthetic optically inactive alpha-amino acid polyamides having outstanding strength in film and fiber form. A still further object is the provision of a new intermediate for polyamides. Other objects will appear hereinafter.

These objects are accomplished by the invention of DL-methionine-N-carboanhydrides and of polyamides having in effective amount, preferably in predominant amount, and even more preferably, essentially exclusively, DL-methionine

—NHCH—CO—
|
(CH$_2$)$_2$SCH$_3$ recurring units. Synthetic alpha-monoamino-monocarboxylic acid polyamides containing a preponderance of combined DL - methionine units—particularly the homopolyamide of DL-methionine—are surprisingly among the strongest synthetic, optically inactive alpha-amino acid polyamides in film or fiber form thus far discovered. These DL-methionine polyamides, particularly the homopolyamide, like the DL-alanine polyamides, particularly the homopolyamide, in film form, as cast, exhibit an X-ray diffraction pattern which shows no apparent orientation in its outermost rings. These two families of alpha-amino acid polyamides, i. e., the DL-alanine and DL - methionine polyamides, particularly the homopolyamides, are differentiated from other known alpha-amino acid polyamides in their ability to produce surprisingly strong films and fibers, especially after the polyamide is oriented.

The DL-methionine polyamides, particularly the homopolyamide, are distinguished from the DL-alanine polyamides, particularly the homopolyamide, in being water vapor permeable but also highly water insensitive. Furthermore, these DL - methionine polyamides, particularly the homopolyamide, possess extralinear groups, i. e., extralinear methyl thioether groups, which are capable of ready modification by chemical means. Such modifications, for example, conversion of the extralinear methyl thioether groups to alkyl sulfonium salts, methyl sulfoxy, or methyl sulfone groups, are particularly efficacious in achieving many desired goals—for instance, modifying the organic solubilities of the polyamides or making them controllably more responsive to aqueous processing treatment.

The polyamides of this invention have a chain which consists of recurring

—N—C—C—
     ‖
     O atom groups and can be conveniently prepared by polymerizing the amide-forming derivatives, e. g., the esters, the N-carboanhydrides, etc. of DL-methionine (racemic methionine) with or without the amide-forming derivatives of other alpha-aminomonocarboxylic acids. Among the known amide-forming derivatives of the alpha-amino acids, it is preferred to use the N-carbo-anhydrides since they can be conveniently prepared in good yields from readily available materials and are capable of being easily polymerized with evolution of carbon dioxide to high molecular weight film- and fiber-forming alpha-amino acid polyamides. The new compound DL-methionine N-carboanhydride also constitutes a part of this invention.

As used in these examples, inherent viscosity, $\eta_{inh.}$, is defined by the following formula $$\eta_{inh.} = \frac{\ln \eta_{rel.}}{C}$$

wherein $ln$ is the natural logarithm;

$$\eta_{rel.} = \frac{\eta_{solution}}{\eta_{solvent}}$$

$\eta$ being viscosity, and $C$ is the concentration of the solute in grams per 100 cc. of solution. The $\eta_{inh.}$ values given in the following examples refer to results obtained with the polyamide involved dissolved in m-cresol at 25° C. in a concentration of 0.3 g./100 cc. of solution.

Example I

A suspension of 50 parts of DL-methionine in 1070 parts of purified anhydrous dioxane in a reactor fitted with an efficient stirrer, a reflux water condenser, and a gas inlet tube connected to a source of gaseous phosgene and so placed that its lower extremity is just above the surface of the suspension is treated with gaseous phosgene for 44 minutes while maintaining the temperature of the reaction mixture between 40 and 51° C. at such a rate that an excess of phosgene is added. At the end of this time, the dioxane is removed by distillation at 50° C. under the reduced pressure obtained from a water aspirator. The yellow syrup remaining is dissolved in 790 parts of anhydrous diethyl ether and the resulting solution filtered to remove the small portion of DL-methionine hydrochloride obtained. To the filtrate is then added 455 parts of petroleum ether (B. P. 30–60° C.) and the resulting mixture cooled in a solid carbon dioxide/acetone bath. The crystalline product (34 parts), which soon separates out, is removed by filtration. To the filtrate is added an additional 910 parts of petroleum ether and the resulting mixture cooled in an ice/water bath. There is thus obtained an additional 10 parts of product. The combined 44 parts of DL-methionine N-carboanhydride (75% of theory) is twice recrystallized from a diethyl ether/petroleum ether mixture using 15.9 parts of diethyl ether and 3.8 parts of petroleum ether for each part of N-carboanhydride. A small amount of decoloring charcoal is used during each recrystallization to remove traces of colored impurities. The final, twice recrystallized DL-methionine N-carboanhydride is obtained as white needle crystals melting at 44–46° C. and evolving gas vigorously at approximately 100° C.

*Analysis.*—Calculated for $C_6H_9O_3NS$: C, 41.14%; H, 5.15%. Found: C, 41.34%; H, 5.22%.

Example II

Five (5) parts of the N-carboanhydride of DL-methionine prepared as described above from the corresponding amino acid is dissolved in 220 parts of reagent grade benzene, and the resulting solution heated under atmospheric pressure at the reflux while under anhydrous conditions for five days. The viscous, clear solution thus obtained is poured in a thin film onto a glass plate and the benzene allowed to evaporate at room temperature. After being removed from the casting surface with the aid of water and dried at 65° C. for six hours, there is obtained a clear, strong, tough, self-supporting, cold-drawable film of the homopolyamide from DL-methionine exhibiting an $\eta_{inh.}$ of 1.46 and soluble in benzene, m-cresol and tetrachloroethane. Samples of this film, as cast, exhibit a tenacity of 9,700 lb./sq. in. and an elongation of 8% as measured on the Instron tensile tester. Additional samples of this film exhibit a water vapor permeability of 2400–2550 g. of water/100 sq. m./mil/hour and a water absorption of only 3 to 4% upon being exposed to 100% relative humidity for 24 hours after being conditioned at 50% relative humidity. Additional samples of this film after being drawn about 2.25:1 exhibit a tenacity of about 18,000 lb./sq. in. and an elongation of 12%. These results are the highest hitherto obtained for any synthetic, optically inactive alpha-amino acid polyamide.

A similar polymerization carried out under like conditions except that the solution was maintained at 65° C. for seven days led to the production of a DL-methionine homopolyamide of $\eta_{inh.}$ 0.74. A similar polymerization carried out for five days at 65° C. led to the production of a DL-methionine homopolyamide of $\eta_{inh.}$ of 0.64.

The combination of relatively high water vapor permeability and relatively low water absorption is a unique property of the DL-methionine polyamides of this invention. Other polymers known in the art are either highly water vapor impermeable and water insensitive, i. e., non-absorptive, or highly water vapor permeable and water sensitive. Thus, polyethylene, vinyl chloride/vinylidene chloride copolymers and rubber hydrochloride exhibit water vapor permeabilities of about respectively, 23–80, 11, and 40–60 grams of water/100 sq. m./mil/hour and water absorptions of essentially 0% at 100% relative humidity. Similarly, a 35.5/26.5/38.0 hexamethyleneadipamide/hexamethylenesebacamide/epsilon-aminocaproic acid copolyamide exhibits a water vapor permeability of 1250 and a water absorption of 10.5% in the same units determined in the same manner as described previously. Finally, untreated, i. e., non-moistureproof, cellophane, a truly highly water vapor permeable polymer, exhibits a water vapor permeability of 8000, but at the same time a water absorption of 100%, both in the same units as described previously. Thus, the water vapor permeability of 2500–2800 with a water absorption of only 3 to 4% for poly-DL-methionine is indeed surprising.

Example III

A mixture of four parts of DL-methionine homopolyamide and 274 parts of methyl iodide are warmed at the reflux on a steam bath for one hour. The polymer is removed from the resulting suspension and freed of excess methyl iodide by evaporation at room temperature. The product thus obtained (7.8 parts of the methylsulfonium iodide of DL-methionine homopolyamide) is completely water-soluble. After dissolving in about 120 parts of formic acid, the resulting solution is poured onto a glass plate and the formic acid allowed to evaporate at room temperature. Upon removal from the casting surface, there is obtained a light brown-colored, self-supporting film of the methylsulfonium iodide of DL-methionine homopolyamide.

Example IV

A solution of one part each of the N-carboanhydrides of DL-methionine and DL-alanine in about 88 parts of reagent grade benzene is heated at atmospheric pressure under anhydrous conditions and at 65° C. for five days. During this time the copolyamide precipitates from the polymerization medium as a white flocculent material. This copolyamide from a 1:1 by weight mixture of the N-carboanhydrides of DL-methionine and DL-alanine is soluble in m-cresol and formic acid, exhibiting an $\eta_{inh}$. of 0.22 in the former, but is insoluble in dioxane and chloroform.

*Example V*

A solution of one part each of the N-carboanhydrides of DL-methionine and DL-leucine in about 88 parts of reagent grade benzene is heated under atmospheric pressure and anhydrous conditions at 65° C. for five days. At the end of this time, the clear, extremely viscous, but flowable, benzene solution of the copolyamide is flowed in a film onto a glass plate and the benzene solvent allowed to evaporate at room temperature. Upon removal from the casting surface, there is thus obtained a clear, extremely tough, cold-drawable film of the copolyamide from a 1:1 by weight mixture of the N-carboanhydrides of DL-methionine and DL-leucine exhibiting $\eta_{inh}$. of 1.04. This copolyamide is soluble in chloroform, dioxane, and m-cresol.

Although in Example I certain conditions of reaction such as time, temperature, proportions, etc., have been given for the preparation of the novel N-carboanhydride of this invention, it is to be understood that other methods known in the art for preparing N-carboanhydrides can also be used. For instance, the N-carboanhydride of this invention can be prepared as is disclosed in the copending application of Prichard, Serial No. 778,-457, filed October 7, 1947 (now U. S. 2,516,145), by treating the requisite alpha-amino acid in an anhydrous solvent with an alkali metal alkoxide and with carbon dioxide thereby forming the dialkali metal salt of the alpha-carboxyaminocarboxylic acid, reacting thionyl chloride with this salt, and finally isolating the desired N-carboanhydride.

The N-carboanhydride of this invention can also be prepared as is disclosed in the copending application of MacDonald, Serial No. 83,299, filed March 24, 1949, by reacting the amino acid or its alkali metal or alkaline earth metal salts with phosgene under anhydrous conditions.

The novel N-carboanhydride of this invention also can be prepared by reacting the amino acid or its alkali metal, alkaline earth metal or hydrohalide salts with phosgene under anhydrous conditions in the presence of an ether, as is illustrated by Example I.

The novel N-carboanhydride of this invention can also be prepared, though with some difficulty, from the corresponding amino acid as reported by Leuchs, Ber. 39, 857 (1906), by reacting the amino acid with a chloroformate ester, isolating the ester of the N-carboxyamino acid so formed and subsequently reacting this derivative with thionyl chloride under anhydrous conditions and isolating the desired N-carboanhydride. Difficulty is usually encountered in purifying DL-methionine N-carboanhydride so prepared to the degree of purity desired for polymerization.

This invention is also generic to the polymers from the above N-carboanhydride. These polymers are linear condensation polyamides consisting of recurring alpha-monoaminomonocarboxylic acid units 10 to 100% of which are DL-methionine units. When at least 10% of the recurring units of the polyamides of this invention are composed of these residues, the polyamide is capable of controllable modification in its general solubility properties, particularly in its degree of response to aqueous processing treatments, by chemical modification effected through reactions with the extralinear methyl thioether groups. As the proportion of combined DL-methionine units in the polyamides of this invention increases, there is a corresponding increase in the above-described capability of being controllably modified in properties. This becomes particularly noticeable when the polymers contain a major proportion, i. e., more than 50% of DL-methionine units. Furthermore, when this latter level of combined DL-methionine units is reached, the polyamides of this invention are particularly outstanding in exhibiting appreciable water vapor permeability and at the same time a high degree of water insensitivity.

In the case of copolymers containing the combined residues, —NRCR'R"CO—, of other alpha-monoaminomonocarboxylic acids, there are, of course, additional units in the polymer chain other than combined DL-methionine units. However, upon hydrolysis with hydrochloric acid, the polymers of this invention yield alpha-monoaminomonocarboxylic acid hydrochlorides, at least 10% of which is DL-methionine hydrochloride. For the best properties in films and fibers prepared from the polyamides of this invention, a degree of polymerization (DP) of greater than 50 is preferred.

Alpha-monoaminomonocarboxylic acids other than those mentioned previously whose N-carboanhydrides are copolymerized with the novel N-carboanhydride of this invention, to form the polyamides of this invention includes, for example, alpha-primary-monoaminoalkanoic acids, e. g., glycine, L-alanine, L-leucine, isoleucine, pseudoleucine, norleucine, valine, norvaline, alpha - amino - n - butyric acid, alpha-methyl-alpha-amino-n-butyric acid, alpha-amino-n-heptanoic acid, alpha-amino-n-octanoic acid, alpha-aminolauric acid, alpha-aminomyristic acid, alpha-aminoisobutyric acid, alpha-amino-diethylacetic acid, alpha-aminoisoamylacetic acid, 2-amino-4,6,6-trimethylheptanoic acid; cycloaliphatic - alpha - primary - monoamino-monocarboxylic acids, e. g., 1-aminocyclo-pentanecarboxylic acid, 1-aminocyclohexanecarboxylic acid, 1 - aminocycloheptanecarboxylic acid; aromatic - substituted - aliphatic - alpha-monoaminomonocarboxylic acids, e. g., beta-phenylalanine, alpha-phenylglycine, L-phenylalanine, and beta (m-tolyl) alanine; cycloaliphatic-substituted-aliphatic alpha-monoamino-monocarboxylic acids, e. g., alpha-aminocyclo-hexylacetic acid; N - aryl - substituted - alpha-secondary-monoaminomonocarboxylic acids, e. g., N-phenylglycine, N-o-tolylglycine; N-alkyl-substituted - alpha - secondary - monoaminomono-carboxylic acids, e. g., N-methylglycine, N-iso-propylglycine, N-butylglycine, N-octadecylglycine, N-isopropylleucine, N-methylalanine.

The polyamides and copolyamides of this invention are preferably prepared in the presence of organic liquids by the condensation polymerization (thermal or initiated by water, alcohols, phenols, organic acids, or amino-hydrogen containing amines) of the previously defined monoaminomonocarboxylic acid N-carboanhydrides with carbon dioxide evolution. The N-carboanhydrides are preferably made from the amino acids or their inorganic acid, alkali metal, or alkaline earth metal salts, by reaction with phosgene as detailed above. Suitable organic liquids that can be used for the polymerization include aromatic hydrocarbons, e. g., benzene, xylene; halogenated hydrocarbons, e. g., chloroform, chlorobenzene, tetrachloroethane, carbon tetrachloride; alicyclic ketones, e. g., cyclohexanone; hydrocarbon ethers, e. g., anisole and dibutyl ether.

The N-carboanhydrides are suitably heated in a vessel adapted to permit the escaping of carbon dioxide to that temperature at which carbon dioxide begins to be evolved at an appreciable rate under the conditions of reaction. This varies with different amino acids, but it is usually in the range from 25 to 200° C. and generally within 30–50° C. of the melting point of the lowest melting N-carboanhydride present in the mixture to be polymerized. The time of the reaction can be shortened or the temperature can be lowered or both can be accomplished by the use of reaction initiators, e. g., water, alcohols, phenols, organic acids or amino hydrogen-containing amines.

The polyamides of this invention containing appreciable proportions of combined DL-methionine units, as has been discussed previously, are characterized by the ease of controllable modification in properties, particularly in solubility properties, as effected through structural modification of the polyamides by chemical reactions carried out on the extralinear methyl thioether groups. As the proportions of combined DL-methionine units increase the properties of the polyamides become more nearly those of DL-methionine homopolyamide. For instance, when a preponderance, i. e., more than 50%, of the alpha-amino acid units in the polyamides of this invention are DL-methionine units, the polyamides are surprisingly strong, particularly when oriented, water insensitive and at the same time appreciably water vapor permeable. As the proportion of combined DL-methionine units of the polyamides of this invention increases still further, for instance, 75% or more of the alpha-amino acid units, these polyamides are appreciably stronger, particularly when oriented, and appreciably more soluble in aromatic hydrocarbon and halogenated hydrocarbon type solvents than most of the other alpha-amino acid polyamides. This is particularly true when the polyamides of this invention are contrasted with polyamides containing major proportions of units of straight-chain hydrocarbon alpha-amino acids, especially those acids having relatively short chain carbon skeletons. Thus, by controlling the amount of DL-methionine units and the degree of chemical modification of the extralinear methyl thioether groups in these DL-methionine units the polyamides of this invention can be prepared with a wide range of properties. This varied range of properties easily affords the preparation from the same intermediates of alpha-amino acid polyamides possessing many of the properties useful in general film and fiber outlets to any desired degree.

The foregoing detailed description has been given for clearness of understanding only and no unnecessary limitations are to be understood therefrom. The invention is not limited to the exact details shown and described for obvious modifications will occur to those skilled in the art.

What is claimed is:
1. DL-methionine-N-carboanhydride.
2. A linear polyamide, the chain of which consists of recurring

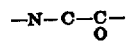

atom groups and the recurring units of which are DL-methionine units.

ROBERT N. MacDONALD.

References Cited in the file of this patent
UNITED STATES PATENTS

| Number | Name | Date |
|---|---|---|
| 2,534,283 | MacDonald | Dec. 19, 1950 |
| 2,572,844 | MacDonald | Oct. 30, 1951 |

OTHER REFERENCES

Meyer: Natural and Synthetic High Polymers Interscience, 1942, pp. 428 and 429.

Office of Technical Services, PB 34279, December 13, 1946, 3 pages.

Woodward et al.: Journal American Chemical Soc., vol. 69, pp. 1551, 1552.

Go et al.; Bulletin Chemical Society of Japan, 1939, pp. 510 to 516.

Dekker et al.: J. Biological Chemistry, vol. 173, pp. 471 to 473, 1948.

Certificate of Correction

Patent No. 2,650,214                                          August 25, 1953

ROBERT N. MacDONALD

It is hereby certified that error appears in the printed specification of the above numbered patent requiring correction as follows:

Column 1, line 5, strike out "copolyamides (Macdonald U. S. Patents 2,572,844" and insert instead *monocarboxylic acids are of considerable interest.*; line 7, for "copolymers" read *copolyamides*; column 5, line 23, after "exhibiting" insert *an*;

and that the said Letters Patent should be read as corrected above, so that the same may conform to the record of the case in the Patent Office.

Signed and sealed this 20th day of October, A. D. 1953.

[SEAL]

ARTHUR W. CROCKER,
*Assistant Commissioner of Patents.*